(12) United States Patent
Itou et al.

(10) Patent No.: US 6,974,645 B2
(45) Date of Patent: Dec. 13, 2005

(54) FUEL CELL SYSTEM

(75) Inventors: Yasuyuki Itou, Yokohama (JP); Hiroshi Miyakubo, Yokosuka (JP)

(73) Assignee: Nissan Motor Co., Ltd., Kanagawa (JP)

(*) Notice: Subject to any disclaimer, the term of this patent is extended or adjusted under 35 U.S.C. 154(b) by 226 days.

(21) Appl. No.: 10/380,795

(22) PCT Filed: Oct. 25, 2002

(86) PCT No.: PCT/JP02/11080

§ 371 (c)(1),
(2), (4) Date: Mar. 19, 2003

(87) PCT Pub. No.: WO03/052854

PCT Pub. Date: Jun. 26, 2003

(65) Prior Publication Data

US 2004/0048122 A1   Mar. 11, 2004

(30) Foreign Application Priority Data

Dec. 17, 2001 (JP) .............................. 2001-382798

(51) Int. Cl.[7] .............................................. H01M 8/04
(52) U.S. Cl. ......................................... 429/22; 429/24
(58) Field of Search ............................ 429/25, 24, 19, 429/22

(56) References Cited

U.S. PATENT DOCUMENTS

| | | | |
|---|---|---|---|
| 5,979,418 A | 11/1999 | Saruwatari et al. | |
| 6,635,372 B2 * | 10/2003 | Gittleman | 429/17 |

FOREIGN PATENT DOCUMENTS

| | | |
|---|---|---|
| DE | 199 16 386 A1 | 10/2000 |
| JP | 8-28370 | 1/1996 |
| JP | 9-315801 | 12/1997 |
| JP | 10-196467 | 7/1998 |
| JP | 2000-192863 | * 7/2000 |
| JP | 2000-192863 A | 7/2000 |
| JP | 2001-106506 A | 4/2001 |

* cited by examiner

*Primary Examiner*—Patrick Joseph Ryan
*Assistant Examiner*—Thomas H. Parsons
(74) *Attorney, Agent, or Firm*—McDermott Will & Emery LLP

(57) ABSTRACT

A compressor which adjusts the pressure of an oxygen-containing gas supplied to a fuel cell system, a throttle valve which controls the flowpath surface area of part of the oxygen-containing gas, and shutoff valves which divide the oxygen-containing gas downstream of the compressor between a fuel cell and reformer, are provided. When fuel vapor absorbed by the canister is purged, the opening of the throttle valve is reduced, and the canister is made to communicate with the upstream side of the compressor. Due to the negative pressure upstream of the compressor, fuel vapor absorbed by the canister is divided between the reformer or a burner, and processed.

10 Claims, 15 Drawing Sheets

FUEL CELL SYSTEM

FIELD OF THE INVENTION

This invention relates to a fuel cell system, and more particularly to a technique which effectively uses fuel vapor generated in a fuel tank.

BACKGROUND OF THE INVENTION

A vehicle fuel vapor control device disclosed in JP2000-192863A published by the Japanese Patent Office in 2000 comprises a canister which absorbs fuel vapor generated in a fuel tank. The fuel vapor absorbed by the canister is released and converted to hydrogen and carbon dioxide by a reformer. This converted hydrogen is supplied to a fuel cell, and effectively used as fuel gas.

SUMMARY OF THE INVENTION

However, in the prior art, a pump is installed between the canister and reformer, and the fuel separated from the canister is sent to the reformer by driving the pump. Therefore, energy is required to drive the pump. Heat energy is also required to perform reforming of the fuel, and there is a possibility that this will lead to a corresponding worsening of fuel economy.

When the fuel vapor is sent to the reformer, it is reformed to produce hydrogen which is then delivered to the fuel cell. As a result, the fuel cell generates power. However, the power generated by the fuel cell charges a battery, so when the battery is fully charged, the generated power is wasted. In other words, energy (fuel) is merely consumed to treat the fuel vapor.

It is therefore an object of this invention to provide a fuel cell system which can process fuel vapor in a fuel tank without consuming excessive energy.

In order to achieve above object, the present invention provides a fuel cell system comprising a pressurizing mechanism which aspirates an oxygen-containing gas and delivers it under pressure, a fuel tank, a reformer which generates a hydrogen-containing gas from raw fuel supplied from the fuel tank, a fuel cell which generates power by reacting the oxygen-containing gas from the pressurizing mechanism and hydrogen-containing gas from the reformer, a canister connected to the fuel tank which absorbs fuel vapor from the fuel tank, a first passage which connects between the canister and the aspiration side of the pressurizing mechanism, a first valve provided in the first passage, and a controller which functions to open the first valve to connect the canister to the aspiration side of the pressurizing mechanism when the fuel vapor absorbed by the canister is to be purged.

The details as well as other features and advantages of this invention are set forth in the remainder of the specification and are shown in the accompanying drawings.

DESCRIPTION OF THE PREFERRED EMBODIMENTS

Figure 1:
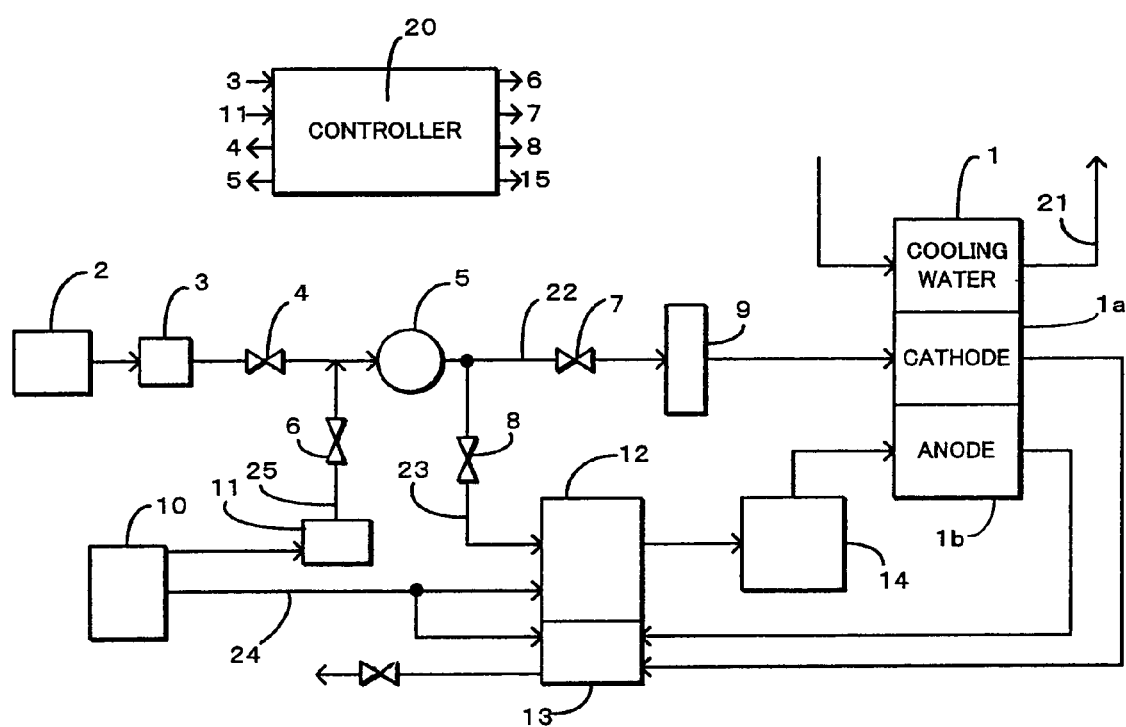
FIG. 1 is a schematic view of a fuel cell system according to this invention.

Referring to FIG. 1 of the drawings, FIG. 1 shows a fuel cell system in a first embodiment. Air containing oxygen is supplied to a cathode $1a$ of a fuel cell 1 from an air supply system 22, and hydrogen-rich fuel gas is supplied to an anode $1b$ of the fuel cell 1 from a fuel supply system 24. The fuel cell 1 generates electrical energy and water by transporting hydrogen ions between the electrodes. At this time, heat energy is also produced, and the fuel cell 1 is maintained at a suitable temperature by cooling water which flows through a cooling system 21 so that power is efficiently generated.

A filter 2 for removing dust from the air, a flowmeter 3 which measures the supplied air amount, a throttle valve 4 which adjusts the supplied air volume, a compressor 5 which delivers pressurized air with an adjusted flowrate, a shutoff valve 7 which controls the supply of air to the fuel cell 1, and a cooler 9 for adjusting the air temperature which has risen in the compressor 5, to a suitable temperature, are installed in that sequence in the air supply system 22. The air with adjusted flowrate and temperature is supplied to the cathode $1a$. Oxygen is used according to reforming reactions in a reformer 12 described hereafter, so a branch passage 23 which branches off to the reformer 12 downstream of the compressor 5 is provided, and the air amount supplied to the reformer 12 is adjusted by providing a shutoff valve 8 on this branch passage 23.

Also, a fuel tank 10 which stores a raw fuel such as methanol, the reformer 12 which converts the raw fuel from the fuel tank 10 to a hydrogen-rich reformate gas, and a carbon monoxide oxidizer (CO oxidizer) 14 for removing carbon monoxide from the reformate gas which leads to deterioration of the platinum filling the electrodes of the fuel cell 1, are installed in that sequence in the fuel supply system 24, and hydrogen gas is thereby supplied to the anode $1b$ of the fuel cell 1.

The fuel reforming reaction performed in the reformer 12 requires heat energy, so a burner 13 is provided adjacent to the reformer 12. The burner 13 produces heat energy using the exhaust gas from the fuel cell 1 and, if required, raw fuel from the fuel tank.

In this fuel cell system, in order to effectively use fuel vapor generated in the fuel tank 10, a fuel vapor supply system 25 described below is provided. A canister 11 is made to communicate with the fuel tank 10 so as to collect fuel vapor in the fuel tank 10. The downstream end of the canister 11 is connected between the throttle valve 4 of the air supply system 22 and the compressor 5 via a shutoff valve 6 which controls whether or not to discharge the fuel vapor collected by the canister 11.

A controller 20 comprises one, two or more microprocessors, a memory and an input/output interface, and performs purge treatment (hereafter, purge) of the fuel vapor in the fuel tank 10 described later.

Figure 2:
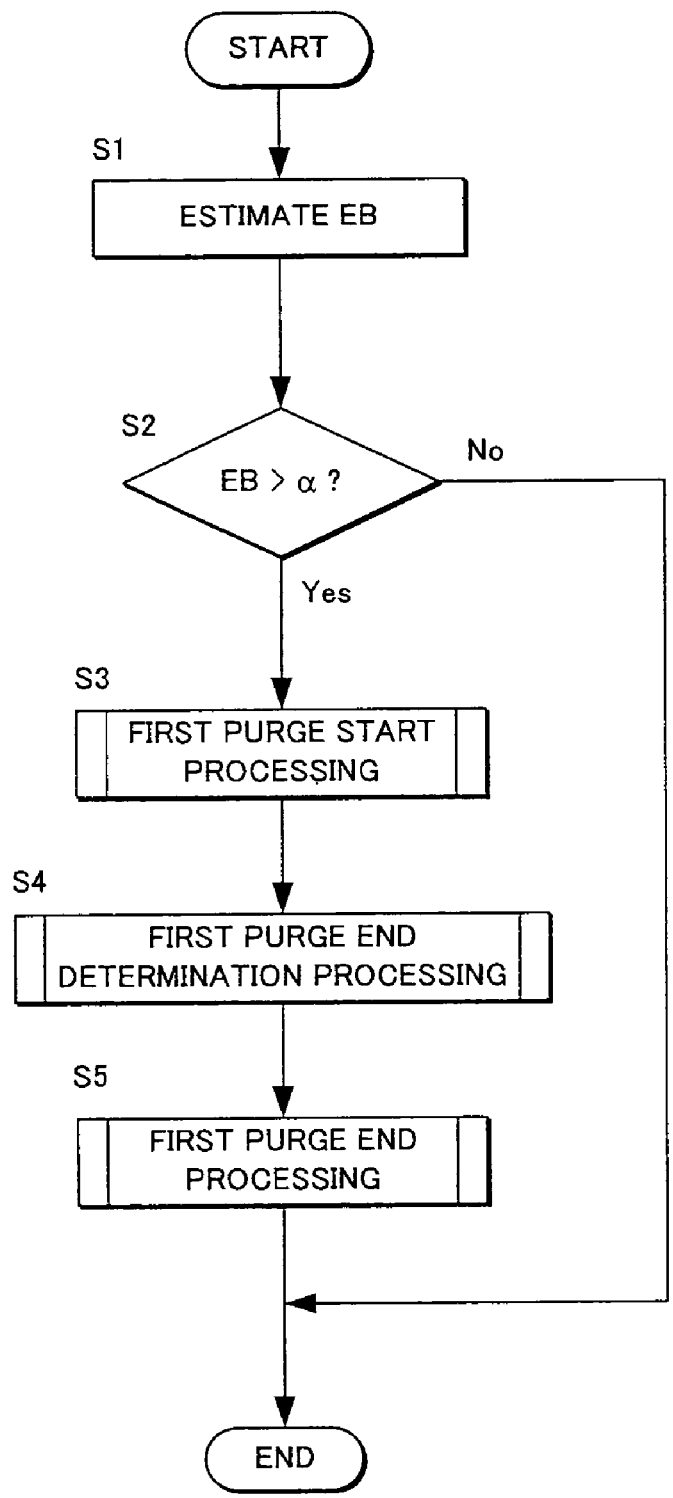
FIG. 2 is a flowchart showing a main routine of fuel vapor purge treatment performed by a controller of the fuel cell system.

FIG. 2 is a flowchart showing the main purge treatment routine performed by the controller 20, and it is executed by the controller 20.

First, in a step S1, a fuel vapor absorption amount EB in the canister 11 is estimated. This is done for example by calculating the amount of fuel vapor produced from the fuel temperature as disclosed in JP8-28370A published by the Japanese Patent Office in 1996, and integrating, by estimating the measurement results from a sensor, or by installing a temperature sensor in the canister 11 and estimating from the temperature variation of the canister as disclosed in JP10-196467A published by the Japanese Patent Office in 1998.

Next, in a step S2, it is determined whether or not the fuel vapor absorbed by the canister 11 is to be purged. If the absorption amount EB found in the step S1 is more than a predetermined value α, e.g., 80% of the total capacity, it is determined that it is required to purge the fuel vapor, and the routine proceeds to a step S3. On the other hand, if the absorption amount EB is less than the predetermined value α, it is determined that purge is not necessary and the routine terminates. Hence, by determining whether or not to purge based on the estimation amount of the fuel vapor amount EB absorbed by the canister 11, the situation where the absorption amount EB overflows and is discharged into the atmosphere causing pollution, and the situation where unnecessary fuel vapor processing is performed even though the absorption amount EB is small, are avoided.

In a step S3, a first purge start processing for starting purge of fuel vapor to the reformer 12 is performed.

Figure 3:
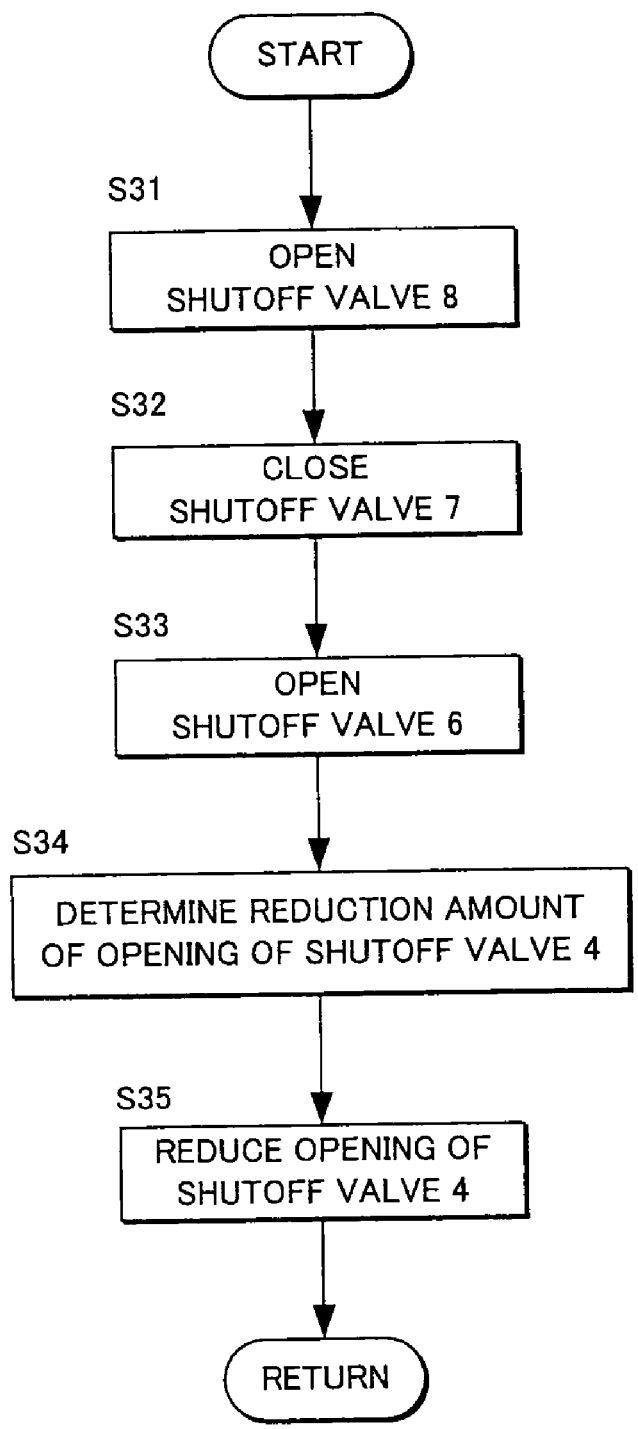
FIG. 3 is a flowchart showing a first purge start processing routine.

FIG. 3 is a flowchart showing a purge start processing routine, and is executed by the controller 20.

In a step S31, the shutoff valve 8 is opened, and air delivered under pressure by the compressor 5 is supplied to the reformer 12. Next, in a step S32, the shutoff valve 7 is closed so that air sent from the compressor 5 is not supplied to the fuel cell 1. The routine proceeds to a step S33, and the shutoff valve 6 is opened to purge fuel vapor absorbed by the canister 11 to the reformer 12 by using the negative pressure upstream of the compressor 5. In this way, a flowpath from the canister 11 to the reformer 12 is formed.

Figure 15:
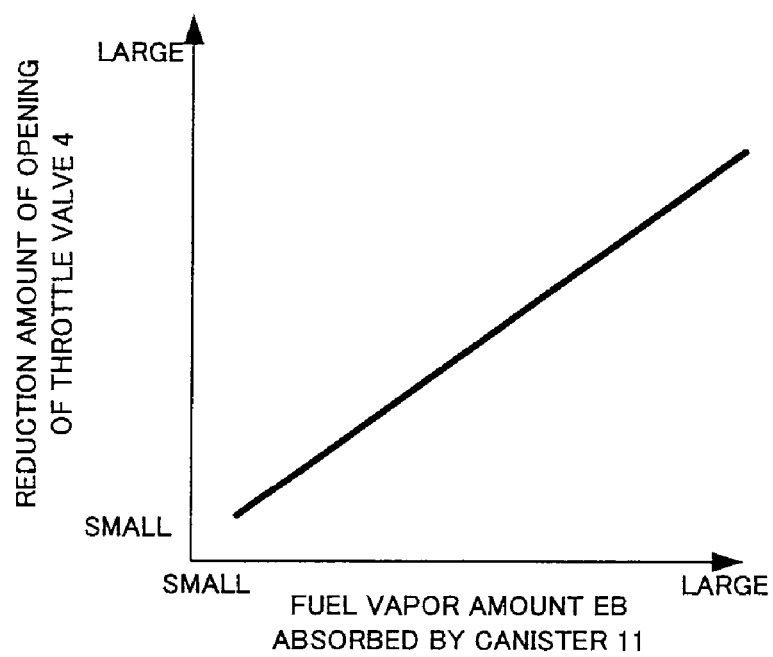
FIG. 15 is a table showing the relation between the fuel vapor amount absorbed by the canister and a reduction amount of a throttle valve opening.

In a step S34, the reduction amount of the opening of the throttle valve 4 is determined from a map shown in FIG. 15. In FIG. 15, the reduction amount of the opening of the throttle valve 4 is set so that the larger the absorption amount EB is, the reduction amount is larger, i.e., the flowpath surface area is smaller. In this way, the larger the absorption amount EB is, the pressure downstream of the throttle valve 4 is lower, and the difference from the internal pressure of the canister 11 is larger, so discharge of fuel vapor downstream of the throttle valve 4 is promoted. When the opening reduction amount has been determined according to the absorption amount EB, the routine proceeds to a step S35, the opening of the throttle valve 4 is reduced, and the rotation of the compressor 5 is increased to deliver the required air amount.

Thus, by opening the shutoff valves 6, 8, closing the shutoff valve 7, reducing the opening of the throttle valve 4 and increasing the rotation speed of the compressor 5, fuel vapor in the canister 11 flows out to the reformer 12 without the need for a pump or the like, and purge of fuel vapor begins.

At this time, in the reformer 12, a reforming reaction of fuel vapor takes place to produce fuel gas for the fuel cell 1, so the fuel vapor can be processed without unnecessarily discarding fuel vapor and impairing fuel economy. Also, the fuel vapor is introduced to the reformer 12 in the gaseous state, so a step to vaporize the fuel in order to carry out the reforming reaction is unnecessary. In this way, it can be easily supplied to the reformer in a state which is easy to reform, and fuel required for vaporization can be economized.

Next, the routine proceeds to a step S4 of FIG. 2, and a first purge end determination processing is performed.

Figure 4:
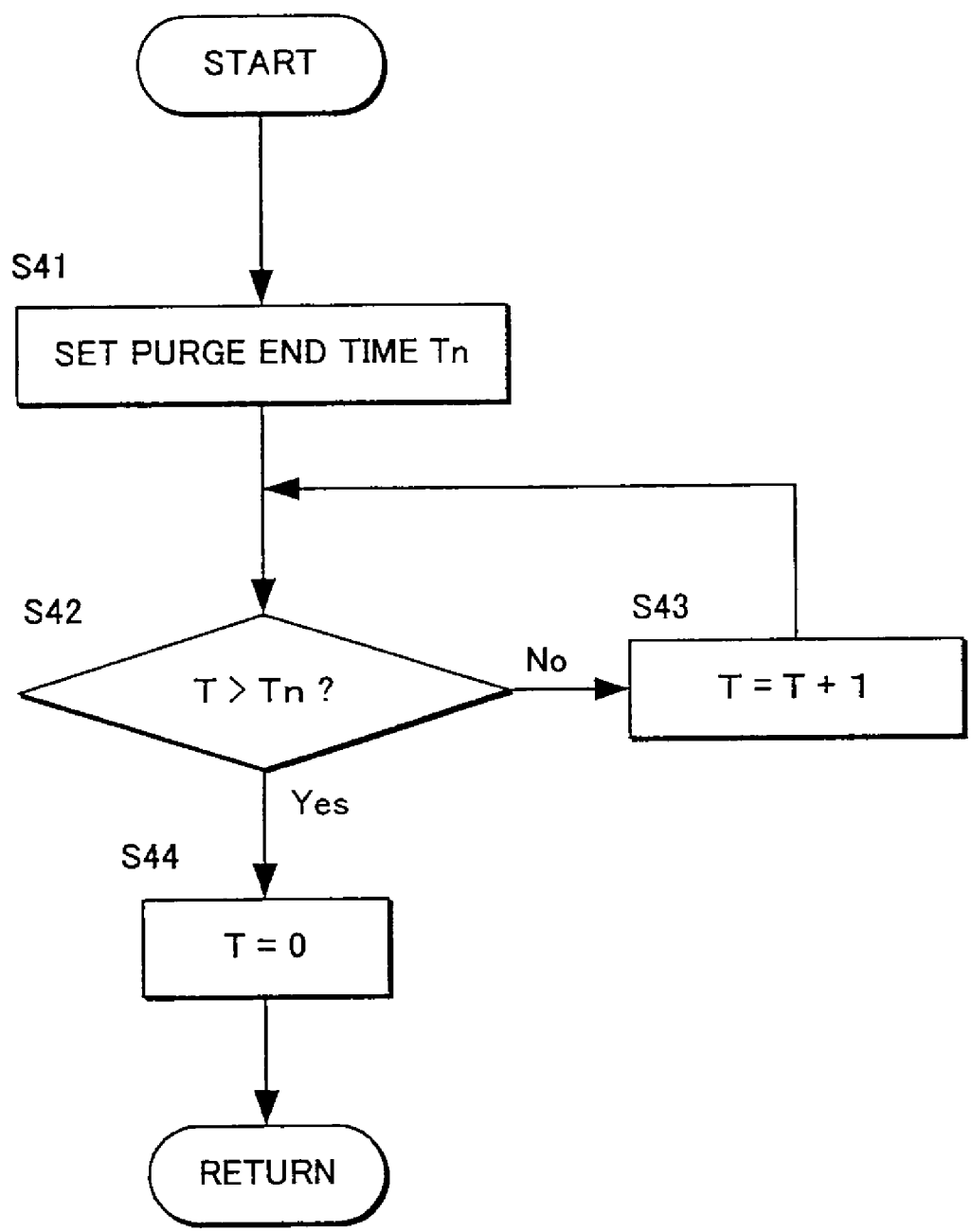
FIG. 4 is a flowchart showing a first purge end determination processing routine.

FIG. 4 is a flowchart showing the first purge end determination processing, and is executed by the controller 20.

In a step S41, a purge end time Tn is set. The purge end time Tn is determined according to the fuel vapor amount EB absorbed by the canister 11. In a step S42, it is determined whether or not the purge end time Tn has elapsed by a timer with which the controller 20 is provided. If it has not yet elapsed, the routine proceeds to a step S43, and a timer count time T is incremented. This is repeated until, in a step S42, the timer count time T exceeds the purge end time Tn. The routine then proceeds to a step S44, the timer count time T is cleared and it is determined that purge has terminated. Herein, the end of purge was determined by time, but a concentration detection sensor may be installed in the discharge passage, and the end of purge may be determined from this sensor value. Thus, the canister 11 can be fully purged by determining the end of purge.

When end of purge is determined, in FIG. 2, the routine proceeds from the step S4 to the step S5, and a first purge end processing which changes over from purge to the reformer 12, to ordinary processing, is performed.

Figure 5:
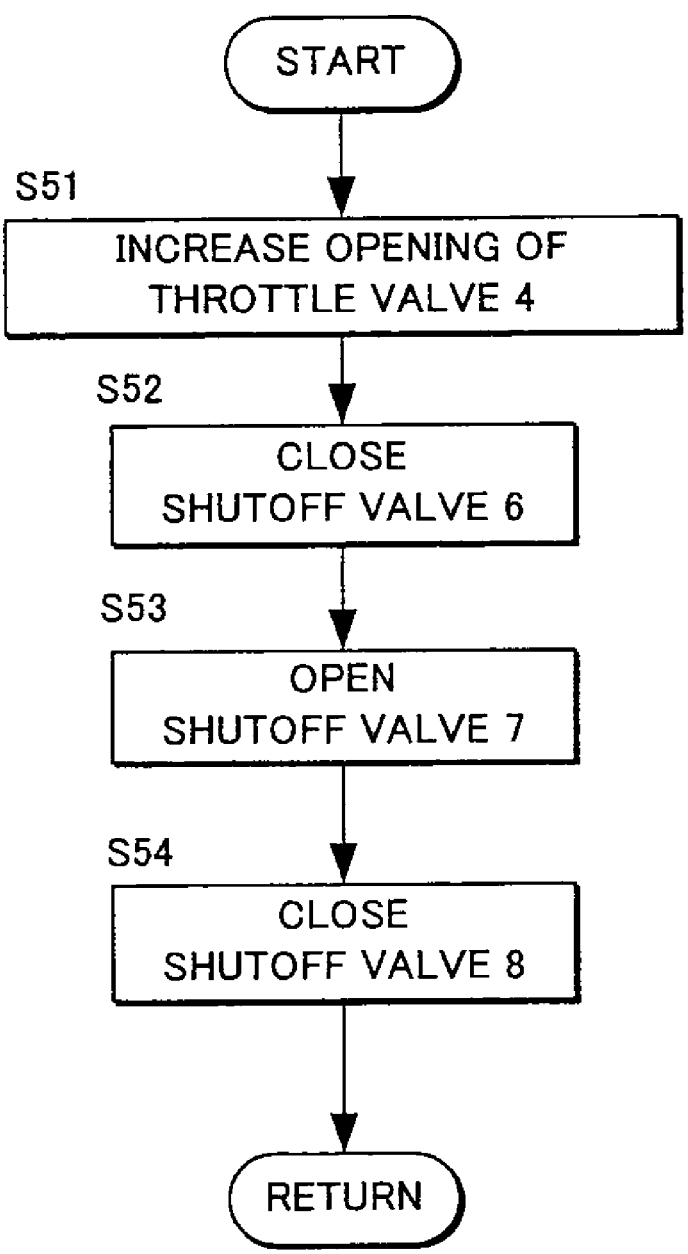
FIG. 5 is a flowchart showing the first purge end processing routine.

FIG. 5 is a flowchart showing the first purge end processing routine, and is executed by the controller 20.

In a step S51, the opening of the throttle valve 4 is increased, and is returned to the opening for normal running. The rotation speed of the compressor 5 is then decreased corresponding to the required air flowrate of the fuel cell system. In a step S52, the shutoff valve 6 is closed to stop discharge of fuel vapor from the canister 11 to the air supply system 22. In a step S53, after fuel vapor from the canister 11 has passed through the shutoff valve 8, the shutoff valve 7 is opened and air from the compressor 5 is sent to the fuel cell 1. Herein, the determination whether all the fuel vapor has passed through the shutoff valve 8 is performed by determining whether or not a predetermined time has elapsed, or by providing a concentration detection sensor upstream of the shutoff valve 8 and taking the measurement results. Next, in a step S54, the shutoff valve 8 downstream of the reformer 12 is closed, or if air is to be supplied to the reformer 12, its opening is decreased according to the supply amount.

By performing the first purge end processing, air from the compressor 5 is supplied to the cathode 1a of the fuel cell 1, and if necessary, the reformer 12, without mixing with fuel vapor, and ordinary running can be started.

When fuel vapor is purged, by closing the shutoff valve 7, opening the shutoff valves 8, 6, and increasing the reduction amount of the opening of the throttle valve 4, the pressure of the part connected to the fuel vapor supply system 25 of the air supply system 22 becomes lower than the internal pressure of the canister 11, so fuel vapor in the canister 11 is discharged to the air supply system 22 and is delivered to the reformer 12 together with air supplied via the throttle valve 4. Hence, fuel vapor can be purged without providing a pump or the like to deliver fuel vapor from the canister 11 to the reformer 12. Also, reformate gas is produced in the reformer 12 using fuel vapor as the raw material, and this is used as fuel gas for the fuel cell 1, so fuel economy can be improved without unnecessary consumption of fuel vapor.

Further, the reduction amount of the opening of the throttle valve 4 is increased according to the estimation amount of the absorption amount EB. When the absorption amount EB is large, the pressure drop between the throttle valve 4 and the compressor 5 increases and the difference from the internal pressure of the canister 11 increases, so discharge of fuel vapor is promoted and the fuel vapor can be rapidly purged. When fuel vapor is purged, power generation by the fuel cell 1 is temporarily decreased or stopped, but the insufficiency due to this is covered by a secondary battery.

Figure 6:
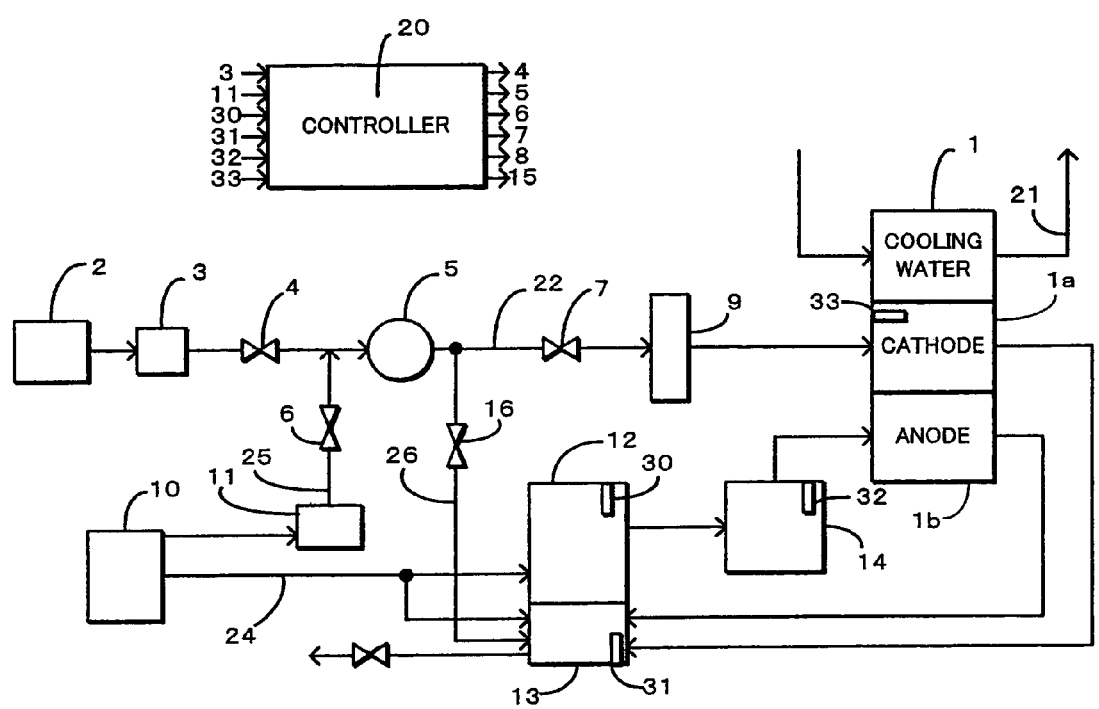
FIG. 6 is similar to FIG. 1, but showing a second embodiment of this invention.

FIG. 6 shows the construction of a fuel cell system according to a second embodiment of this invention. Instead of the branch passage 23 in the first embodiment, a branch passage 26 is provided which connects the burner 13 and the downstream of the compressor 5 via a shutoff valve 16. Also, a reformer temperature sensor 30 is installed in the reformer 12, a burner temperature sensor 31 is installed in the burner 13, a CO oxidizer temperature sensor 32 is installed in the CO oxidizer 14, and a fuel cell temperature sensor 33 is installed in the fuel cell 1. The measurement results from these sensors are input to the controller 20.

Figure 7:
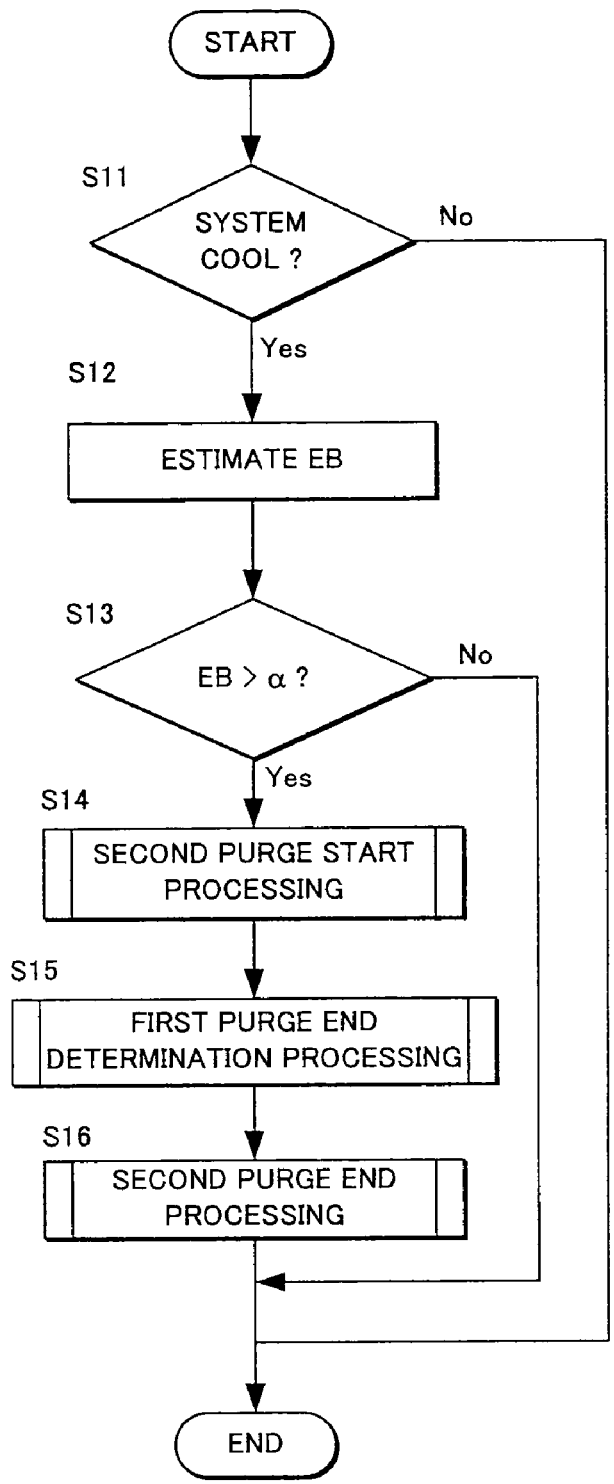
FIG. 7 is a flowchart of a purge treatment main routine according to the second embodiment.

Next, the purge treatment performed by this fuel cell system will be described referring to FIG. 7. FIG. 7 is a flowchart showing a purge treatment main routine, and is executed by the controller 20. Herein, the system is warmed up on start-up, etc., by burning purged fuel vapor in the burner 13.

First, in a step S11, it is determined whether or not the system has sufficiently warmed up from the detection results of the reformer sensor temperature 30, burner temperature sensor 31, CO oxidizer temperature sensor 32 and fuel cell temperature sensor 33. If the system has sufficiently warmed up, the routine is terminated, otherwise the routine proceeds to a step S12.

In the steps S12, S13, the absorption amount EB is estimated in an identical manner to the steps S1, S2 of the first embodiment, and it is determined whether or not fuel vapor should be purged. If it is determined that it should be purged, the routine proceeds to a step S14, and a second purge start processing is performed to purge fuel vapor to the burner 13.

Figure 8:
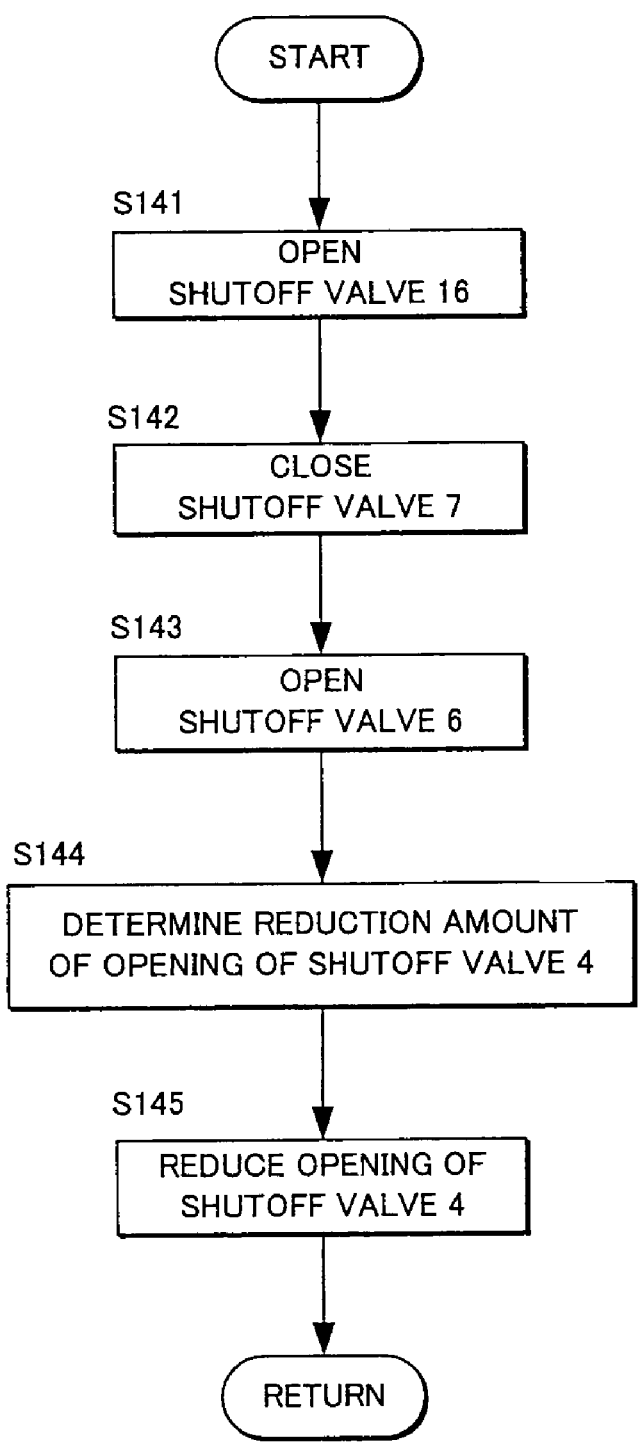
FIG. 8 is a flowchart showing a second purge start processing routine.

FIG. 8 is a flowchart showing the second purge start processing routine, and is executed by the controller 20.

In the first purge start processing, in a step S31, the shutoff valve 8 was opened to supply fuel vapor to the reformer 12, but here the shutoff valve 16 is opened in a step S141 to supply fuel vapor to the burner 13. Fuel vapor is thus supplied to the burner 13 and combustion starts, so the adjacent reformer 12 can be warmed up. Subsequent steps S142–S145 are identical to the steps S32–S35 of the first purge start processing.

When purge has been started by the second purge start processing, in a step S15 of FIG. 7, a first purge end determination processing is performed in an identical manner to that of the step S4 in the first embodiment.

When purge end is determined in the step S15, the routine proceeds to a step S16, and purge is terminated by a second purge end processing which changes over from purge to the burner 13, to ordinary running.

Figure 9:
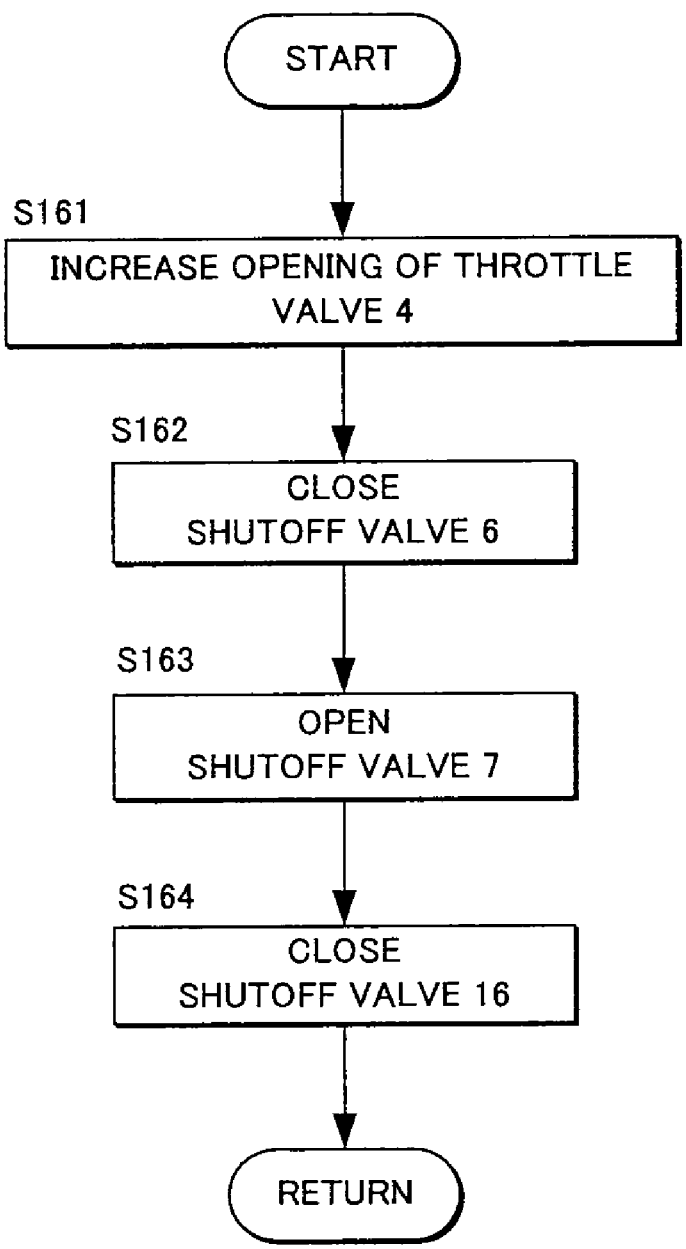
FIG. 9 is a flowchart showing a second purge end processing routine.

FIG. 9 is a flowchart showing the second purge end processing routine, and is executed by the controller 20.

Steps S161–163 are identical to the steps S51–S53 of the first purge end processing.

However, in the step S54 of the first purge end processing, the shutoff valve 8 is closed to stop supply of oxygen-containing gas to the reformer 12, but herein, the shutoff valve 16 is closed in a step S164 to stop supply of oxygen-containing gas to the burner 13.

In this way, by supplying fuel vapor to the burner 13 when the system has not sufficiently warmed up, fuel vapor is used for warming up the fuel cell system and fuel vapor can be processed without impairing fuel economy. Also, as the fuel vapor is gaseous, there is no need for a vaporization step when fuel is burnt in the burner 13, and fuel consumption can be suppressed.

Figure 10:
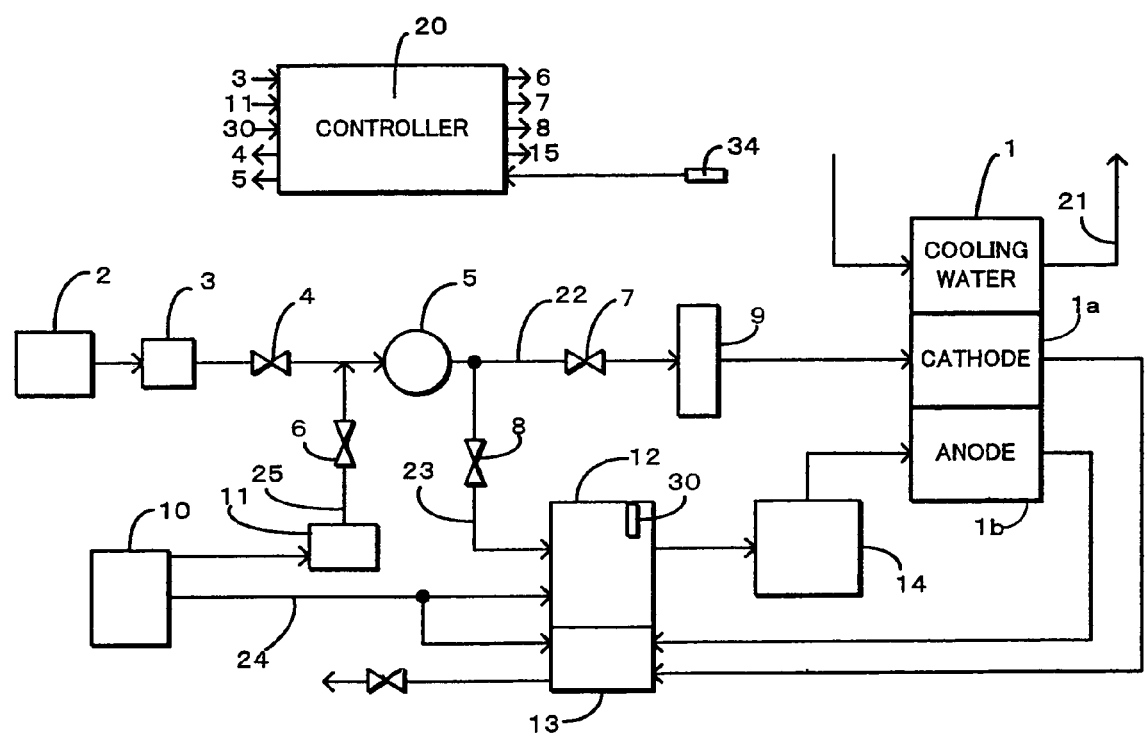
FIG. 10 similar to FIG. 1, but showing a third embodiment of this invention.

FIG. 10 shows the construction of a fuel cell system according to a third embodiment. The temperature sensor 30 is installed which detects the temperature of the reformer 12 of the fuel cell system used in the first embodiment. Also, the controller 20 performs the purge treatment shown by the flowchart of FIG. 11.

First, in steps S21, S22, the fuel vapor amount EB absorbed by the canister 11 is calculated, and it is determined whether or not purge is necessary from the absorption amount EB. If the absorption amount EB is more than a predetermined amount α and it is determined that purge is necessary, the routine proceeds to a step S23. In the step S23, it is determined from the detection result of the reformer temperature sensor 30 whether the catalyst in the reformer 12 is activated. Herein, when fuel vapor is supplied to the reformer 12, if the reformer 12 is cold, the reforming reaction is not efficient and the routine is terminated.

On the other hand, if the reformer 12 has sufficiently warmed up, the routine proceeds to a step S24 and the running state of the fuel cell system is detected. In a step S25, it is determined whether or not the vehicle is running on low load based on the detected running state. This is done by measuring a current value for a predetermined time, for example, the past few minutes-past few tens of minutes, by an ammeter 34 fitted to the fuel cell 1. If this measured value is less than 30% of the rating, or if the vehicle is running at low speed, it is determined that the vehicle is running on low load.

When fuel vapor is processed, power generation by the fuel cell 1 is temporarily decreased or stopped, so power supply must be covered by a secondary battery or the like. Herein, under low load when the power load required by the fuel cell system is not large, fuel vapor is processed. When the vehicle is running under low load, the routine proceeds to a step S26, and if it is not running under low load, the routine is terminated.

In the step S26, a first purge start processing shown in FIG. 3 is performed. Due to this, fuel vapor in the canister 11 is supplied to the reformer 12, and fuel gas for the fuel cell 1 is generated by the reforming reaction.

Figure 12:
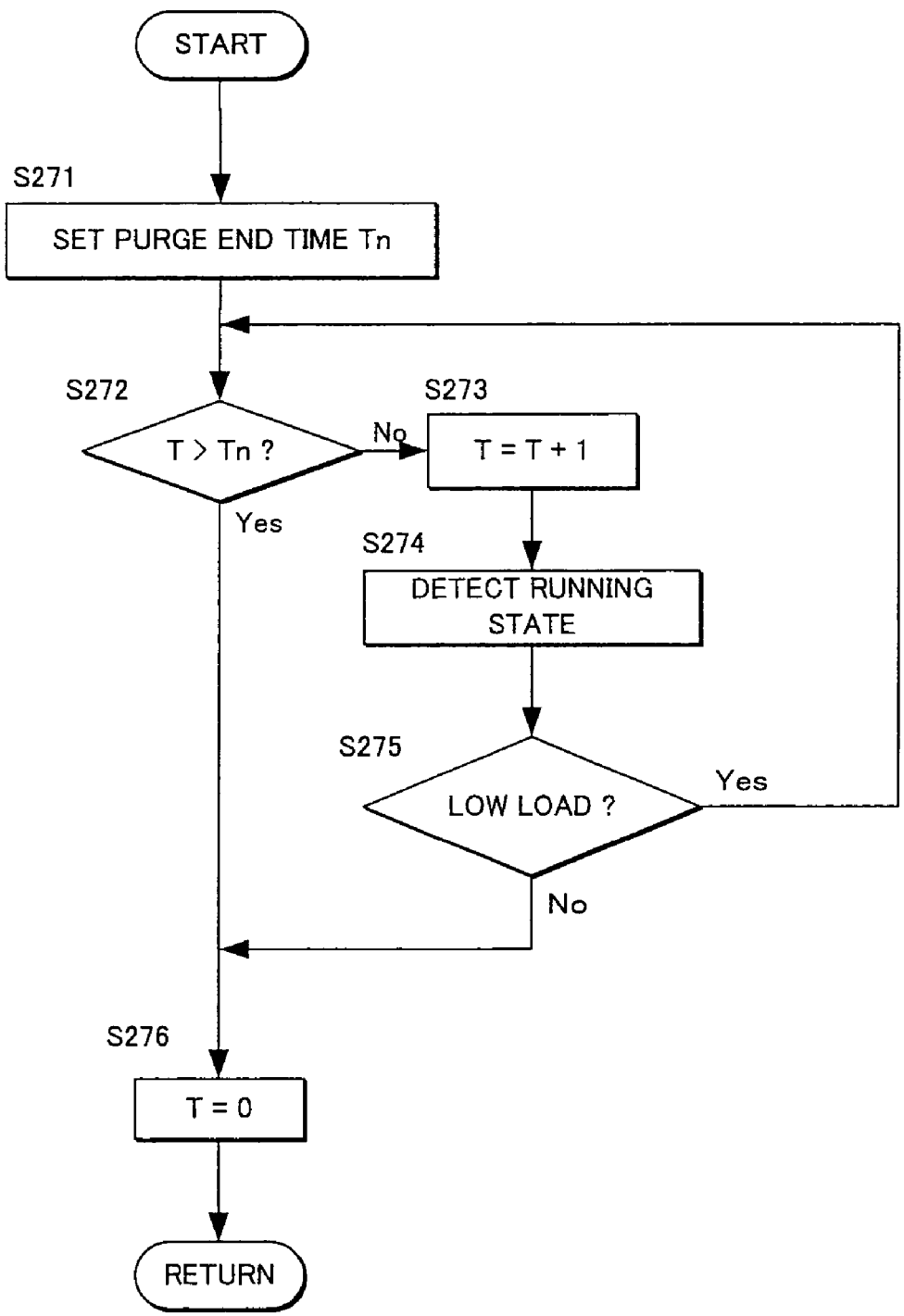
FIG. 12 is a flowchart showing a second purge end determination processing routine.

Next, the routine proceeds to a step S27, and a second purge end determination processing shown in FIG. 12 is performed.

Herein, the determination is identical to the first purge end determination processing shown in FIG. 4. In a step S273, after a timer counter time T is incremented, the routine proceeds to a step S274, and the fuel cell system running state is detected. The routine proceeds to a step S275, and it is again determined whether or not the vehicle is running under low load.

Thus, by repeatedly detecting the running state in this way, a high load is definitively prevented from acting on the secondary battery. If the vehicle is running under low load, the routine returns to the step S272 and it is determined whether or not the purge end time has been reached. If it is not running under low load, a heavy load acts on the secondary power cell, so it is determined that purge should be terminated, the routine proceeds to a step S276 and the timer counter time T is reset.

Figure 11:
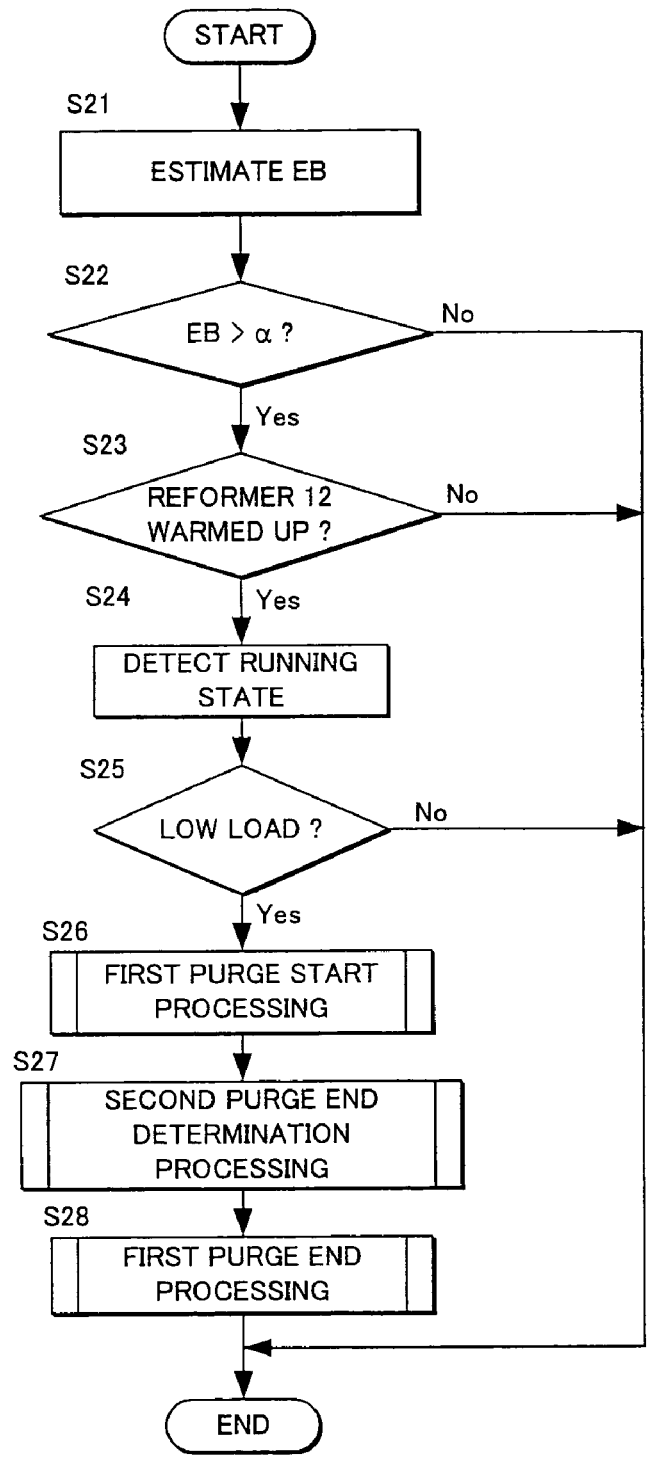
FIG. 11 is a flowchart showing a purge treatment main routine according to the third embodiment.

If it is determined that purge should be terminated due to this second purge end determination processing, the routine proceeds to a step S28 in FIG. 11, and there is a change-over to ordinary running by the first purge end processing.

Hence, when the reformer 12 has sufficiently warmed up and the catalyst is activated, fuel vapor is supplied, so fuel vapor is definitively processed by the reforming reaction, fuel vapor is not discharged to the outside without being processed, and an adverse effect on the environment is avoided.

Also, by adding the fuel cell system running state to the conditions under which the fuel vapor is purged, especially by processing fuel vapor when the running load on the system is low, deterioration of system running performance due to processing of fuel vapor is suppressed.

Figure 13:
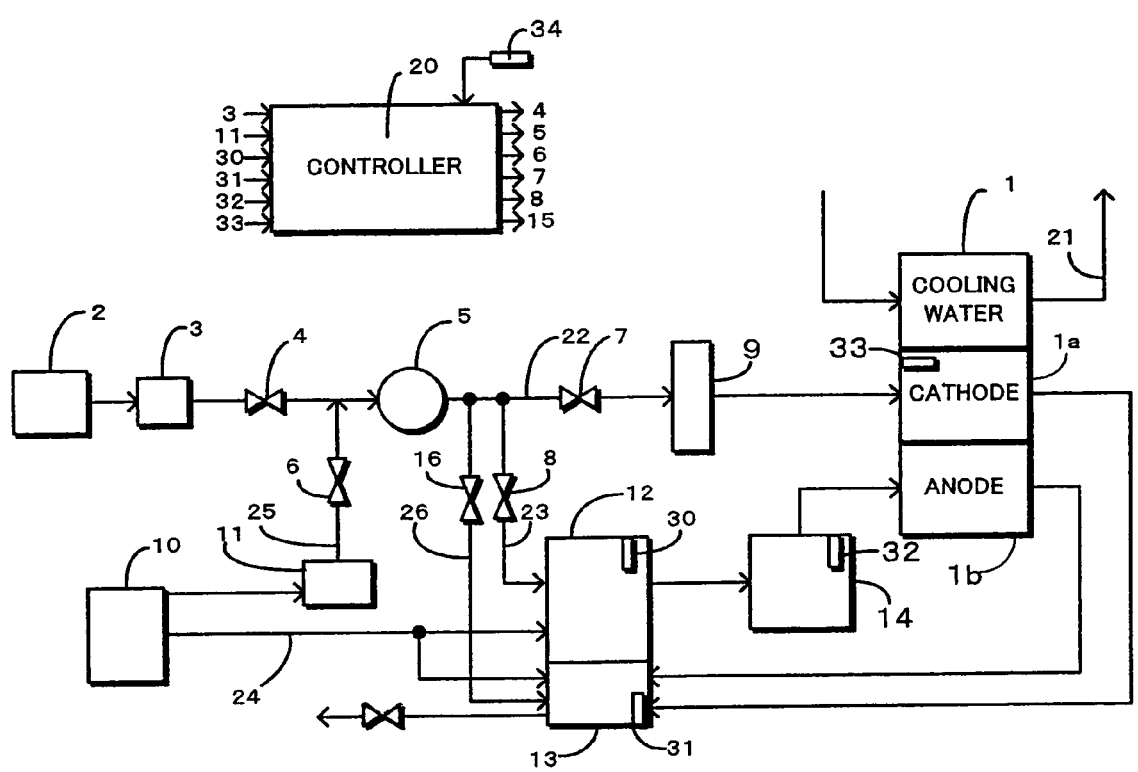
FIG. 13 is similar FIG. 1, but showing a fourth embodiment of this invention.

FIG. 13 shows the construction of a cell system according to a fourth embodiment.

In this embodiment, the flowpath which branches off downstream of the compressor 5 is divided into a branch passage 23 which branches off to the reformer 12 via the shutoff valve 8, and a flowpath 26 which branches off to the burner 13 via the shutoff valve 16. Herein, the branch-off point of the branch passage 26 from the air supply passage 22 is arranged on the side of the compressor 5, and the branch-off point of the branch passage 23 from the air supply passage 22 is arranged on the side of the shutoff valve 7 which is downstream therefrom. Due to this construction, fuel vapor can be supplied to one of the reformer 12 and burner 13 according to the state of the system.

Also, the reformer temperature sensor 30, burner temperature sensor 31, CO oxidizer temperature sensor 32 and fuel cell temperature sensor 33 are installed identically to the second embodiment.

Figure 14:
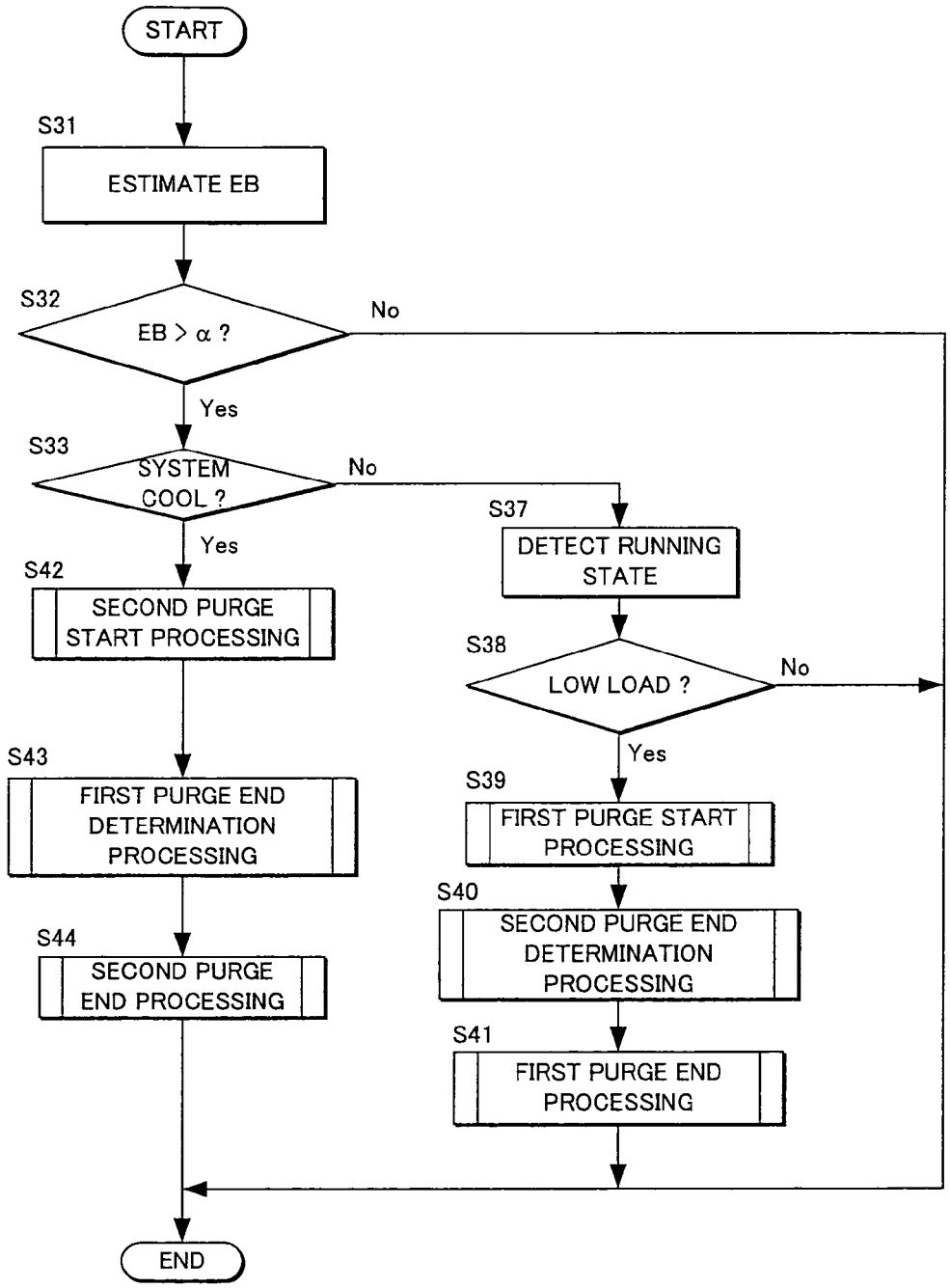
FIG. 14 is a flowchart showing a purge treatment main routine according to the fourth embodiment.

The controller 20 performs the purge treatment shown in FIG. 14.

In steps S31, S32, it is determined whether or not fuel vapor should be purged from the fuel vapor absorption amount EB absorbed by the canister 11. If this is not necessary, the routine is terminated, and if it is necessary, the routine proceeds to a step S33 where it is determined whether or not the system is cold (prior to warmup). If it is determined that the system is cold, a second purge start processing (step S42) which uses fuel vapor in the burner 13, first purge end processing (step S43) and second purge end processing (step S44) are performed, and the vehicle returns to ordinary running.

On the other hand, if it is determined in the step S33 that the system has warmed up, it is determined in steps S37, S38 whether or not the system is running under low load. If it is not running under low load, the routine is terminated, and if it is running under low load, the first purge start processing (step S39), second purge end processing (step S40) and first purge end processing (step S41) are performed, and fuel vapor is used in the reformer 12.

By performing this control, fuel vapor is used by the burner 13 when the system is cold such as on system start-up, and during ordinary running, it is used by the reformer 12 which suppresses the load on the secondary power cell and improves fuel usage efficiency.

The entire contents of Japanese Patent Application P2001-382798 (filed Dec. 17, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

INDUSTRIAL FIELD OF APPLICATION

This invention can be applied to various fuel cell systems including those for use with vehicles. According to the present invention, fuel vapor in a fuel tank can be processed without consuming excess energy, so the fuel economy of the fuel cell system is improved.

What is claimed is:

1. A fuel cell system comprising:
   a pressurizing mechanism which aspirates an oxygen-containing gas and delivers it under pressure,
   a fuel tank,
   a reformer (12) which generates a hydrogen-containing gas from raw fuel supplied from the fuel tank,
   a fuel cell which generates power by reacting the oxygen-containing gas from the pressurizing mechanism and hydrogen-containing gas from the reformer,
   a canister connected to the fuel tank which absorbs fuel vapor from the fuel tank,
   a first passage which connects between the canister and the aspiration side of the pressurizing mechanism,
   a first valve provided in the first passage, and
   a controller which functions to:
   open the first valve to connect the canister to the aspiration side of the pressurizing mechanism when the fuel vapor absorbed by the canister is to be purged.

2. The fuel cell system as defined in claim 1, further comprising:
   a second valve interposed further upstream than the position at which the first passage is connected to the aspiration side of the pressurizing mechanism, and
   a third valve which divides the gas delivered under pressure from the pressurizing mechanism between the fuel cell and the reformer, and
   the controller further functions to:
   decrease the opening of the second valve and lead oxygen-containing gas containing purged fuel to the reformer by using the third valve when fuel vapor is purged.

3. The fuel cell system as defined in claim 2, wherein:
   the controller further functions to:
   purge fuel vapor absorbed by the canister when the reformer is at a temperature at which the reforming reaction is possible.

4. The fuel cell system as defined in claim 1, further comprising:
- a second valve interposed further upstream than the position at which the first passage is connected to the aspiration side of the pressurizing mechanism,
- a burner which generates heat required for the reforming reaction in the reformer, and
- a fourth valve which divides the gas delivered under pressure from the pressurizing mechanism between the fuel cell and the burner, and
- the controller further functions to:
- decrease the opening of the second valve and lead oxygen-containing gas containing purged fuel to the burner using the fourth valve when fuel vapor is purged.

5. The fuel cell system as defined in claim 4, wherein: the controller further functions to:
- determine whether or not the fuel cell system has warmed up, and when the fuel cell system has not warmed up, purge the fuel vapor absorbed by the canister to the burner so as to warm up the fuel cell system.

6. The fuel cell system as defined in claim 1, further comprising:
- a second valve interposed further upstream than the position at which the first passage is connected to the aspiration side of the pressurizing mechanism,
- a burner which generates heat required for the reforming reaction in the reformer, and
- a fifth valve which divides the gas delivered under pressure from the pressurizing mechanism between the fuel cell, the reformer and the burner, and
- the controller further functions to:
- determine whether or not the reformer has warmed up, and
- when fuel vapor is to be purged, decrease the opening of the second valve and lead oxygen-containing gas containing purged fuel to the burner when the reformer has not warmed up, and lead oxygen-containing gas containing purged fuel to the reformer when it has warmed up, using the fifth valve.

7. The fuel cell system as defined in claim 2, wherein the controller further functions to:
- decrease the opening of the second valve more, as the fuel vapor amount absorbed by the canister is larger when fuel vapor is purged.

8. The fuel cell system as defined in claim 1, wherein the controller further functions to:
- perform purge of fuel vapor absorbed by the canister when the fuel vapor amount absorbed by the canister has reached a predetermined amount.

9. The fuel cell system as defined in claim 1, wherein the controller further functions to:
- perform purge of fuel vapor absorbed by the canister only when the load required by the fuel cell system is lower than a predetermined low load.

10. A fuel cell system comprising:
- a pressurizing mechanism which aspirates an oxygen-containing gas and delivers it under pressure,
- a fuel tank,
- a reformer which generates a hydrogen-containing gas from raw fuel supplied from the fuel tank,
- a fuel cell which generates power by reacting the oxygen-containing gas from the pressurizing mechanism and hydrogen-containing gas from the reformer,
- a canister connected to the fuel tank which absorbs fuel vapor from the fuel tank, and
- means for connecting the canister to the aspiration side of the pressurizing mechanism when the fuel vapor absorbed by the canister is to be purged.

* * * * *